Figure 1:
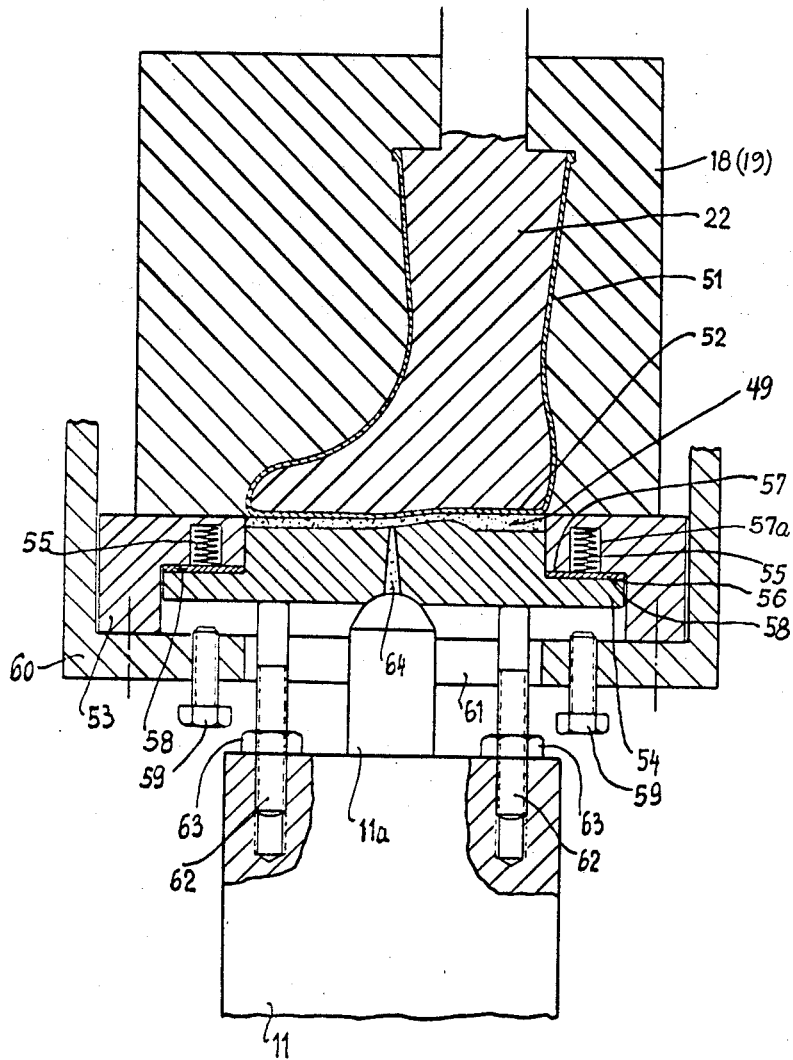

Sept. 10, 1968     H. LUDWIG     3,400,429
INJECTION MOLDING APPARATUS FOR
ARTICLES, ESPECIALLY FOOTWEAR Filed Sept. 29, 1966     3 Sheets-Sheet 1

HERBERT LUDWIG
INVENTOR.

BY

ATTORNEY

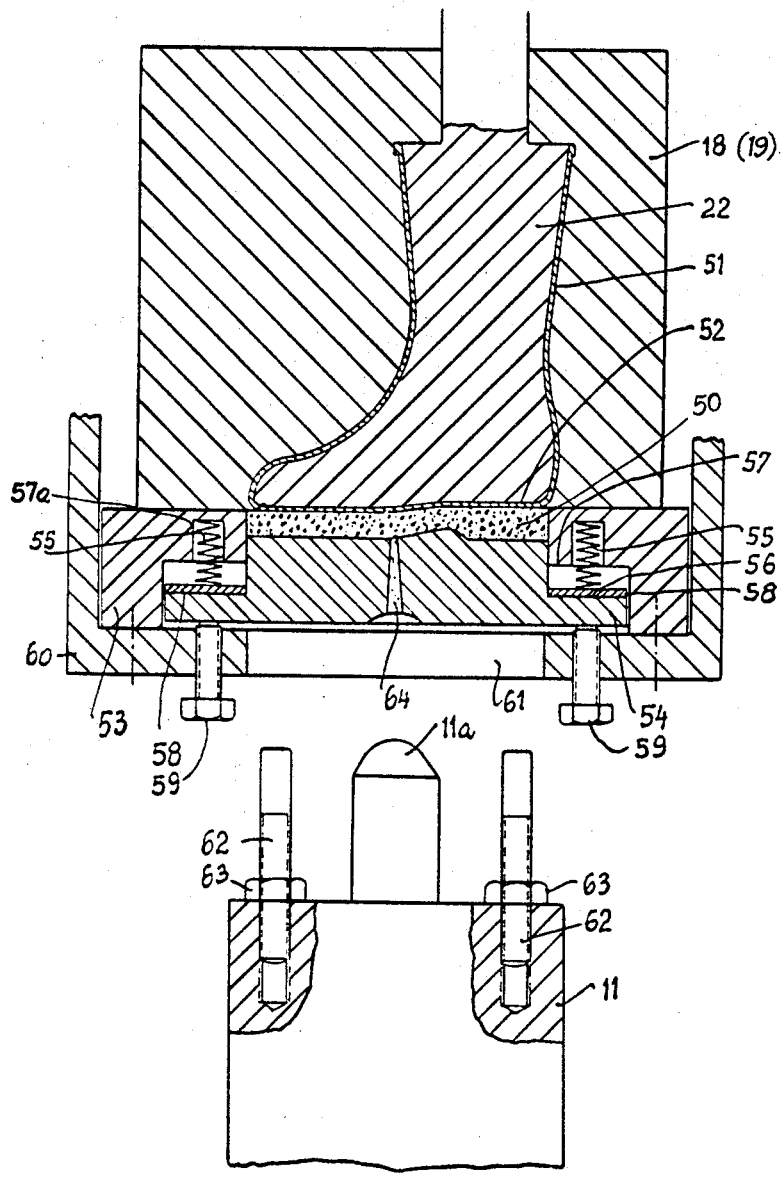

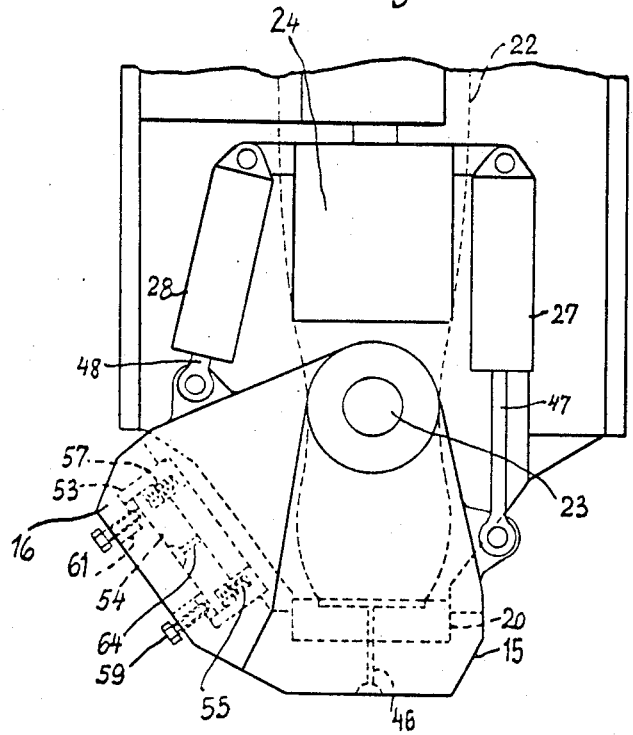

3,400,429
INJECTION MOLDING APPARATUS FOR
ARTICLES, ESPECIALLY FOOTWEAR
Herbert Ludwig, Desmastrasse 112, Usen, near
Bremen, Germany
Filed Sept. 29, 1966, Ser. No. 583,015
Claims priority, application Germany, Feb. 19, 1966,
D 49,404
8 Claims. (Cl. 18—30)

The present invention relates generally to injection molding apparatus for plastic articles of all kinds, especially footwear, from various types and/or colors of plastics, including foam materials such as polyvinyl chloride containing expanding or blowing agents to form foamed materials. More particularly, the present invention is an improvement of a copending application of the same applicant, Ser. No. 360,365, filed Apr. 16, 1964, and now U.S. Patent No. 3,302,244.

On footwear made of injection molded synthetic materials, it is desirable, for various purposes, that the sole consist of more than one layer. These multilayer soles may be such that a first sole layer is usually made of a cheaper material of low abrasion resistance, while the second sole layer forming the actual tread portion of the sole should be of a material of high abrasion resistance. Furthermore, especially in the manufacture of plastic boots, it is desirable that the soles be made of several layers or with different colors of plastic material.

Another type of shoe sole which has come increasingly in use in all types of footwear, particularly on boots, is a shoe sole made of foamed material. Such shoes made with foamed plastic soles, possess several remarkable properties with respect to wearing, heat insulation, and durability.

In the above mentioned copending application of the applicant, there is disclosed an apparatus for the injection molding of articles with various kinds of compounds, especially various color compounds, which comprises a mold carrier that can be aligned with several injection heads successively, depending on the number of various compounds used. The mold carrier has several movable parts including a pair of side plates, pivotally mounted about a main axis, a pair of covers swingably mounted on one of the side plates and, a last receiver fixably holding a last. Shaped side members are removably mounted within the side plates and bottom mold parts are disposed within the covers. With one cover aligned with the bottom of the last, a first injection is effected to form the upper and insole of the footwear, following which the other cover is positioned in alignment with the bottom of the last which cover contains a bottom mold member provided with a cavity of a size and shape to form the outsole of the shoe. This arrangement was found wanting in that it failed to provide for the manufacture of foamed soles. It did provide an improvement over a previous invention of the same applicant, now U.S. Patent 3,160,921, granted Dec. 15, 1964, in that it eliminated the need for a removable adaptor which was required during the first injection to form the upper and then had to be manually removed for the second injection to form the sole. The invention in the above referred to copending application Ser. No. 360,365 was designed to eliminate this disadvantage of manual operation by providing a fully automatic injection molding machine capable of high production capacity. The present invention is a further improvement in that it provides for the additional manufacture of foamed soles and/or various layers and/or colors of soles made from synthetic materials.

It is, therefore, an object of the present invention to provide an injection molding apparatus for the manufacture of plastic articles of all kinds, especially footwear, that may be made from various plastic compounds and/or various colored compounds as well as of foamed materials. It is a further object of the present invention to provide a fully automatic injection molding apparatus capable of high production capacity that is simple and efficient in operation. It is a further object of the present invention to permit the conversion of injection molding apparatus as disclosed in said copending application Ser. No. 360,365 so as to allow the production of foamed soled footwear thereby.

In general, the injection molding apparatus of the present invention comprises a mold having movable mold parts including a pair of shaped side members surrounding a fixed last defining a first cavity therebetween to form the upper of the footwear, and a bottom mold member designed to be brought into cooperative engagement with the bottom of said last and provided with a sole plate movable, in conjunction with an injection head, into a first position in proximity to the bottom of said last to form a second cavity between the bottom of the last and the sole plate so as to receive a compacted and thus unexpanded plastic material containing a blowing agent admitted to this second cavity through an injection channel formed in the sole plate and, following withdrawal of the injection head, the sole plate will be forced into a second position at a distance from the bottom of the last defining a third cavity larger than the second cavity. Movement of the sole plate into its second position is effected by stored mechanical energy in the bottom mold member, which stored energy is in the form of a pair of coiled springs compressed as a result of the sole plate being moved into its first position by the injection head. There is also provided, a pair of set screws within the bottom mold member to delimit the extent of displacement of the sole plate in the second position and away from the bottom of the last. This third cavity corresponds in size and shape to the final size and shape of the foamed sole intended to be formed and permits the expansion of the previously injected, compacted, unexpanded material so as to form such a foamed sole therein.

The present invention also allows for the easy conversion of the injection machine as disclosed in my said copending application, Ser. No. 360,365 by the incorporation in the second cover therein, as more fully explained below, of the arrangement for the bottom mold member as will be more fully described below.

The invention will now be described in detail with reference to the accompanying drawings which show an example of a preferred execution of the invention by means of an apparatus for producing footwear with different kinds and/or colors of plastic material for the upper and the sole as well as for the injection molding thereto of foamed soles:

FIG. 1 is a longitudinal section of the apparatus, showing also a portion of an injection head in elevation with parts broken away, which section is similar to FIG. 1 of my said copending application Ser. No. 360,365, but with only such parts shown as are necessary and required for the understanding of the present invention and, furthermore, with the movable sole plate being in its first position;

FIG. 2 is a sectional view similar to that of FIG. 1, but showing the injection head being disengaged from the apparatus and with the movable sole plate being in its second position; and FIG. 3 is a plan view of a portion of the mold carrier as shown in FIG. 2 of my said copending application Ser. No. 360,365, particularly showing the pair of covers swingably mounted on one of the side plates and with one of the covers being modified in accordance with and embodying the present invention.

As may be best observed in FIGS. 1 and 2, the injection molding apparatus of the present invention comprises a pair of shaped side members 18 and 19 swingably surrounding a fixed last 22 so as to define a first cavity or space therebetween designed to form the upper 51 of the footwear, as herein shown, a boot. How these side members 18 and 19 and the last 22 are operatively mounted in the apparatus is shown in and described with reference to the drawings of my said copending application Ser. No. 360,365 and, for purposes of clarity, are omitted here.

Arranged in cooperation with these side members 18 and 19 and, in particular, in alignment with the bottom of the last 22, there is provided, a bottom mold member that is designed to be brought into cooperative engagement therewith, and that may be conveniently incorporated in one of the pair of swing-like covers as shown in FIG. 3 in a manner as more fully described below.

The bottom mold member of the invention consists of a cover 60 that may be arranged with respect to the mold in like manner as cover 15 is secured to the mold carrier of the apparatus as disclosed in and described with reference to FIG. 1 in my said copending application Ser. No. 360,365. Cover 60, however, differs from said cover 15 in other respects, namely; cover 60 is provided with an opening 61 for the admission therethrough of an injection head 11. Furthermore, inside the cover 60 is securely mounted thereto, a side frame 53 that is provided with contact surfaces 57 into which are formed a pair of bores 57a to accommodate therein, a pair of coiled springs 55 respectively. Within the frame 53 and cover 60, is movably mounted a sole plate 54 formed with shoulders 56 designed to cooperate with the contact surfaces 57 of the side frame 53. A pair of exchangeable spacers 58, whose functional significance will be more fully adverted to below, are preferably positioned between the shoulders 56 of the sole plate 54 and the contact surfaces 57 of the side frame 53. It is to be noted that the coiled springs 55 act against one side of these spacers 58, with the other end of the springs being firmly anchored in the bores 57a. The sole plate 54 is furthermore provided with an injection channel 64 designed to accommodate the injection nozzle 11a of the injection head 11 so as to permit a plastic material to be admitted through the sole plate 54. The cover 60 is also provided with at least a pair of adjustable set screws 59 located substantially in axial alignment with the coiled springs 55 and adjacent the opening 61. As may be observed in FIG. 2, these adjustable set screws 59 operate to delimit the extent of downward movement of the sole plate 54 by acting against the underside thereof.

The injection head 11, in addition to being provided with an injection nozzle 11a to cooperate with the injection channel 64, is preferably also provided with a plurality of guiding and pressing members 62 circumferentially positioned with respect to the injection nozzle 11a.

Such guiding and pressing members may be in the form of thrust bolts 62 received at one end within suitable bores in the injection head 11 and are provided with respective adjusting nuts 63 by means of which they may be individually adjusted so as to contact the outside bottom surface of the sole plate 54 simultaneously with each other and in cooperation with the injection nozzle 11a so as to exert a uniformly distributed pressure against the underside of the movable sole plate.

In FIG. 3, which is a plan view of only a portion of the mold carrier as shown in FIG. 2 of my said copending application Ser. No. 360,365, there is shown a pair of covers 15 and 16, swingably mounted about a pivoting axis 23 on one of the side plates of the apparatus. The construction of cover 15 of FIG. 3 here is exactly identical to the construction of cover 15 as shown in said FIGURE 2 of my said copending application Ser. No. 360,365. As more fully' described therein, this cover 15 is provided with a mold part 20 having an injection passage in alignment with the injection channel 46 of the cover 15.

Swing-like motion of the covers 15 and 16 is conviently effected by means of piston drives 27 and 28 secured to a supporting piece 24 and being provided with piston rods 47 and 48 respectively, which operate to bring alternately, one or the other of the covers 15 and 16 into alignment with the bottom side of the fixed last 22.

The other cover 16 of FIG. 3 herein, however, has been redesigned in accordance with the invention so as to incorporate therein, the bottom mold member arrangement of the present invention hereinbefore described in detail with reference to FIGS. 1 and 2. In particular, it should be noted that the mold part 21 of the cover 16 as shown in FIG. 2 of my said copending application has been replaced by the bottom mold member arrangement as above described with reference to FIGS. 1 and 2. Identical reference characters, of course, refer to identical parts throughout.

In operation, the injection molding apparatus of the invention works as follows:

Within shaped side members 18 and 19, surrounding the fixed last 22, is first formed the upper 51 of the particular footwear. This upper 51 may, if desired, be pulled over the last 22, or it may be formed in the apparatus as disclosed in my said copending application Ser. No. 360,365 by using an injection position as shown in FIG. 3 here. In this position as shown in FIG. 3, the cover 15 with its mold part 20 and with the injection channel 46, is aligned with the bottom side of the fixed last 22 so as to form between the mold part 20 and the bottom of last 22, a cavity to form the insole layer 52 and also to form the upper 51, about the last 22, of the footwear during this first injection. Following this first injection and the subsequent cooling and setting of the now formed upper 51 and insole layer 52, the apparatus is actuated automatically to swing cover 16 so as to align its bottom mold member, shown in and described with reference to FIGS. 1 and 2 here, with the bottom side of the last 22. The swing-like motion of the covers 15 and 16 is effected in like manner as more fully disclosed in my said copending application Ser. No. 360,365. Now the injection molding of a foamed sole is effected, utilizing a foam plastic material containing an expanding or blowing agent and preferably made of a different color than the compound used to form the upper 51 and the insole layer 52.

Before injection of the compacted unexpanded foam material may be effected, the injection head 11 together with its injection nozzle 11a and the plurality of circumferentially spaced guiding and pressing members 62 are introduced within the cover 60 through the opening 61 so as to bear against the outside of the movable sole plate 54 and move this sole plate 54 into its first position, as shown in FIG. 1 herein.

The extent of the upward movement of the movable sole plate 54 may be regulated by the exchangeable spacers 58, in particular by the thickness thereof so as to define between the bottom side of the last 22 and the inner surface of the sole plate 54, a further cavity into which the compacted unexpanded plastic compound 49 containing a blowing agent may be injected through the injection nozzle 11a and via injection channel 64, substantially as shown in FIG. 1.

Following completion of the injection of the still compacted and unexpanded plastic material 49 containing a blowing agent, the injection head 11 is disengaged and withdrawn from contact with the underside of the sole plate 54. Thereupon, the stored mechanical energy in the coiled springs 55, which have been compressed within the bores 57a during injection as may be observed in FIG. 1, is now permitted to exert its force against the spacers 58 and the shoulders 56 so as to move thereby the sole plate 54 into its second operative position, as shown in FIG. 2 herein. As may be observed, the pair of adjustable set screws 59 will effectively delimit the downward movement of the sole plate 54. It is to be understood that the enlarged cavity thereby as now formed between the bottom side of the last 22 and the upper surface of the sole plate 54 is selected so as to correspond precisely to the size and shape of the bottom sole layer of the footwear to be formed. Within this enlarged cavity, the heretofore injected, compacted and unexpanded foam plastic material may now expand responsive to its blowing agent so as to fill the entire enlarged cavity to form a foamed sole 50 therein.

After the foamed sole 50 is allowed to cool and set, the apparatus of the invention may be opened as more fully described in my said copending application and the footwear may then be conveniently stripped from the last 22.

As may be noted, the invention eliminates the need for hydraulic means heretofore employed to effectuate the movement of the sole plate and utilizes instead, the stored mechanical energy built up during injection by the injection head itself. The invention thus provides an improved injection molding apparatus used for the manufacture of plastic articles of all kinds, especially footwear, in a simple, economical and fully automatic manner. The invention further provides for the easy conversion of injection molding apparatus as disclosed in my said copending application so as to allow the production of foam soled footwear thereby.

It should be understood that the present disclosure is for the purpose of illustration only and that this invention includes all modifications and equivalents which fall within the scope of the appended claims.

What is claimed is:

1. Injection molding apparatus comprising a mold having movable mold parts including side members surrounding a last defining a first cavity, and a bottom mold member provided with a sole plate movable between a first position in proximity to the bottom of said last defining a second cavity and a second position at a distance from the bottom of said last defining a third cavity larger than said second cavity, said bottom mold member including a cover movable toward and away from said side members and also pivotally movable with respect to said last.

2. The injection molding apparatus as defined in claim 1 in which said cover has a side frame secured thereto and defining contact surfaces provided with bores, said movable sole plate provided with shoulders to cooperate with said surfaces, and coiled springs mounted within said bores for exerting pressure against said shoulders, whereby said sole plate may be forced into its said second position.

3. The injection molding apparatus as defined in claim 2, in which spacer members are inserted between said shoulders and said contact surfaces.

4. The injection molding apparatus as defined in claim 3 in which there is further provided, in said cover, a pair of set screws for limiting the extent of movement of said sole plate responsive to said coiled springs.

5. Injection molding apparatus comprising a mold having movable mold parts, including shaped side members surrounding a fixed last defining a first cavity, and bottom mold members alternatively movable into position opposite the bottom of said last to form, in conjunction with the bottom, a cavity at the bottom corresponding in thickness to said first cavity, and then following swing-like interchange of said mold members to form, in conjunction with an injection head and the bottom of said last, a second cavity, and following withdrawal of the injection head to form, in conjunction with the bottom of said last, a third cavity larger than said second cavity, said third cavity being formed responsive to stored mechanical energy acting against said mold member.

6. The injection molding apparatus as defined in claim 5 in which one of said bottom mold members is provided with a fixed mold part, and the other of said bottom mold members is provided with a sole plate movable between a first position in proximity to the bottom of said last and a second position at a distance from the bottom of said last.

7. The injection molding apparatus as defined in claim 6 in which said movable sole plate is moved into its said first position by pressure exerted thereagainst by an injection head and following withdrawal thereof is moved into its said second position responsive to stored energy in said bottom mold member.

8. The injection molding apparatus as defined in claim 7 in which said stored energy is in the form of a pair of coiled springs.

References Cited
UNITED STATES PATENTS

| | | | |
|---|---|---|---|
| 2,465,417 | 3/1949 | Bagshaw et al. | 18—30 |
| 3,160,921 | 12/1964 | Ludwig | 18—34 X |
| 3,284,558 | 11/1966 | Ludwig | 18—30 X |
| 3,302,244 | 2/1967 | Ludwig | 18—30 |

WILBUR L. McBAY, *Primary Examiner.*